United States Patent
Tsai et al.

(10) Patent No.: US 7,858,213 B2
(45) Date of Patent: Dec. 28, 2010

(54) HYBRID ELECTRODE AND METHOD OF PREPARING THE SAME

(75) Inventors: Dah-Shyang Tsai, Taipei (TW); Susanti Diah, Taipei (TW); Ying-Sheng Huang, Taipei (TW)

(73) Assignee: National Taiwan University of Science & Technology, Taipei (TW)

( * ) Notice: Subject to any disclaimer, the term of this patent is extended or adjusted under 35 U.S.C. 154(b) by 818 days.

(21) Appl. No.: 11/802,202

(22) Filed: May 21, 2007

(65) Prior Publication Data

US 2008/0068776 A1 Mar. 20, 2008

(30) Foreign Application Priority Data

Sep. 19, 2006 (TW) .............. 95134560 A (51) Int. Cl.
*B32B 9/00* (2006.01)
*B05D 5/12* (2006.01)
*C23C 14/00* (2006.01)

(52) U.S. Cl. .............. 428/702; 428/689; 428/697; 427/581; 427/126.3; 204/192.1

(58) Field of Classification Search .............. 428/689, 428/697, 702; 427/581, 126.3; 204/192.1
See application file for complete search history.

(56) References Cited

U.S. PATENT DOCUMENTS

| 4,715,691 | A | * | 12/1987 | Sata et al. ............. 359/267 |
| 5,645,930 | A | * | 7/1997 | Tsou ................ 428/328 |
| 5,851,506 | A | * | 12/1998 | Zheng et al. ......... 423/592.1 |
| 5,875,092 | A | * | 2/1999 | Jow et al. .............. 361/502 |
| 6,649,211 | B2 | * | 11/2003 | Lyons et al. .......... 427/126.5 |
| 6,863,792 | B1 | * | 3/2005 | Madou et al. ......... 205/86 |
| 2004/0038090 | A1 | * | 2/2004 | Faris ................. 429/12 |

* cited by examiner

*Primary Examiner*—Gwendolyn Blackwell
(74) *Attorney, Agent, or Firm*—Muncy, Geissler, Olds & Lowe, PLLC (57) ABSTRACT

A hybrid electrode and a method of preparing the same are provided. The hybrid electrode includes a substrate, a one-dimensional electrical nanosized conductor of anhydrous ruthenium dioxide or anhydrous iridium dioxide, and a hydrous ruthenium dioxide filled in the one-dimensional electrical nanosized conductor. The hybrid electrode further includes a metal layer formed by reduction of a part of the one-dimensional nanostructure. The hybrid electrode provides high power and high capacitance in a limited space.

36 Claims, 8 Drawing Sheets
(4 of 8 Drawing Sheet(s) Filed in Color)

HYBRID ELECTRODE AND METHOD OF PREPARING THE SAME

BACKGROUND OF THE INVENTION

1. Field of the Invention

The invention relates to an electrode utilized in electrochemical microcapacitor, and more particularly to an electrode with a one-dimensional conductive hybrid nanostructure.

2. Description of the Related Art

With the rapid development of microelectronic technology and biological engineering techniques, demand for various energy storage devices has increased. Electrochemical capacitors are popular because they offer higher energy density than conventional capacitors and higher power density than secondary cells and fuel cells. Although electrochemical capacitors (ultracapacitors) are similar to cells and conventional capacitors in structures, they possess advanced properties, for example, higher discharge power density and a longer charge/discharge cycle life than secondary cells. Additionally, electrochemical capacitors offer an energy density several thousand times greater than conventional capacitors.

Ruthenium dioxide crystals of rutile structure can serve as a low resistance (~35 μΩcm) metal conductor as well as an electrochemical capacitor charge storage material. The charge of ruthenium on electrode surface is reduced from +4 to a lower state through series of redox reactions to bring into its unique property of pseudocapacitance. Although one-dimensional anhydrous ruthenium dioxide nanorods ($RuO_2NR$) possess high conductivity that facilitates rapid charge/discharge, its comparatively low electrochemical area yields a mediocre capacitance thereof. Hydrous ruthenium dioxide is a mixed conductor of electron and proton and its nanosized rutile clusters intimately interfaced with water render itself proton conductive, resulting in high electrochemical area and capacitance. Hydrous ruthenium dioxide, however; exhibits lower electrical conductivity than anhydrous ruthenium dioxide.

Recently, research results regarding preparation of ruthenium dioxide capacitors have been reported, utilizing, for example, the laser direct-write technique to fabricate a hydrous ruthenium dioxide microcapacitor with high capacitance (see C. B. Arnold, J. Electrochem. Soc., 150, A571, 2003). The laser direct-write technique is, however, hardly a technique for mass production. An electrochemical capacitor comprising carbon nanotubes or titanium dioxide nanorods supporting electric double-layer capacitors and hydrous ruthenium dioxide serving as a charge storage material dispersed therein is disclosed (see Y. G. Wang, Electrochimica Acta, 49, 1957, 2004 and Y. T. Kim, J. Mater. Chem., 15, 4914, 2005). Such capacitors, however, has high capacitance and low power density. Additionally, an electrode structure comprising hydrous ruthenium dioxide or ruthenic acid serving as a charge storage material is disclosed (see W. Sugimoto, Chem. B, 109, 7330, 2005 and C. C. Hu, J. Electrochem. Soc., 151, A281, 2004). Such electrodes, however, exhibit low capacitance per unit area.

Thus, development of a ruthenium dioxide electrode with high capacitance and high power density is desirable.

BRIEF SUMMARY OF THE INVENTION

The invention discloses a hybrid electrode comprising a one-dimensional anhydrous ruthenium dioxide nanorods assembly serving as an electrical channel and a hydrous ruthenium dioxide with porosity serving as the charge storage medium and the proton channel. The hydrous ruthenium dioxide is deposited into the gaps of the one-dimensional anhydrous ruthenium dioxide nanorods.

The hybrid electrode further comprises a ruthenium layer formed on the surface of the one-dimensional anhydrous ruthenium dioxide nanostructure. The ruthenium layer is formed by reduction of a part of the one-dimensional anhydrous ruthenium dioxide nanostructure.

The one-dimensional anhydrous ruthenium dioxide nanostructure is grown on the substrate by chemical vapor deposition or reactive sputtering. The hydrous ruthenium dioxide is deposited into the gaps of the one-dimensional anhydrous ruthenium dioxide nanostructure by an electrochemical method.

In one embodiment, the one-dimensional anhydrous ruthenium dioxide nanostructure is replaced by a one-dimensional anhydrous iridium dioxide nanostructure. The hybrid electrode further comprises an iridium layer formed by reduction of a part of the one-dimensional anhydrous iridium dioxide nanostructure.

The invention also discloses a method of preparing a hybrid electrode applied to mass production of electrochemical capacitors with high capacitance and high power, in which a substrate is provided. A one-dimensional anhydrous ruthenium dioxide nanostructure with gaps is grown on the substrate. A hydrous ruthenium dioxide is deposited into the gaps of the one-dimensional anhydrous ruthenium dioxide nanostructure.

The method further comprises reducing a part of the one-dimensional anhydrous ruthenium dioxide nanostructure to ruthenium before the hydrous ruthenium dioxide is deposited into the gaps of the one-dimensional anhydrous ruthenium dioxide nanostructure.

The one-dimensional anhydrous ruthenium dioxide nanostructure is replaced by a one-dimensional anhydrous iridium dioxide nanostructure. Additionally, prior to depositing the hydrous ruthenium dioxide into the gaps of the one-dimensional anhydrous iridium dioxide nanostructure, the method further comprises reducing a part of the one-dimensional anhydrous iridium dioxide nanostructure to iridium.

The hybrid electrode provided by the invention is prepared by a one-dimensional high-conductivity nanostructure and hydrous ruthenium dioxide dispersed therein, achieving high capacitance and high power in a restricted area.

A detailed description is given in the following embodiments with reference to the accompanying drawings.

BRIEF DESCRIPTION OF THE DRAWINGS

The patent or application file contains at least one drawing executed in color. Copies of this patent or patent application publication with color drawing(s) will be provided by the office upon request and payment of the necessary fee.

The invention can be more fully understood by reading the subsequent detailed description and examples with references made to the accompanying drawing, wherein:

FIG. 4$a$ is a cyclic voltammogram of $RuO_2NR$ electrode according to one embodiment of the invention.

FIG. 4$b$ is a cyclic voltammogram of $RuO_2.xH_2O/RuO_2NR$ electrode according to one embodiment of the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

DEFINITION

Figure 1:
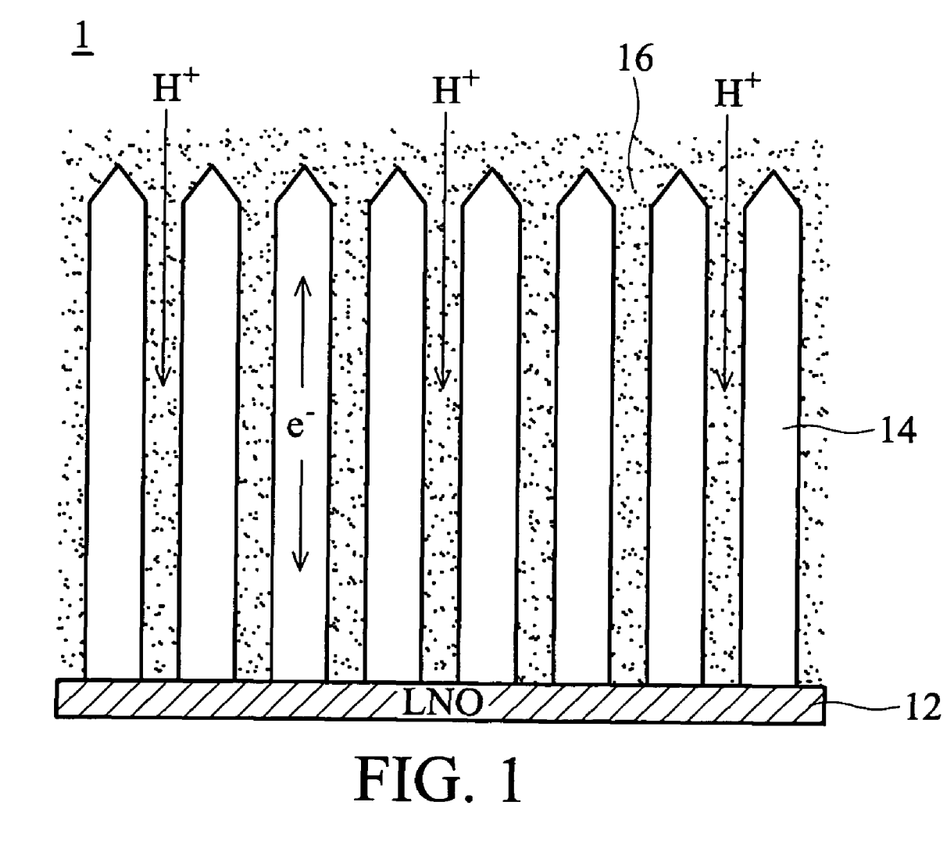
FIG. 1 shows a hybrid electrode structure of the invention.

One-dimensional nanostructure: a bar structure with a nanowidth and a nanoheight RuO$_2$NR: an array of one-dimensional anhydrous ruthenium dioxide nanorods RuO$_2$NR/LNO: a ruthenium dioxide electrode prepared by growth of RuO$_2$NR on a lithium niobium oxide (LNO) (100) substrate Ru/RuO$_2$NR/LNO: a ruthenium dioxide electrode comprising ruthenium formed by reduction of a part of RuO$_2$NR grown on a lithium niobium oxide (LNO) (100) substrate RuO$_2$.xH$_2$O/RuO$_2$NR: a hybrid electrode prepared by filling hydrous ruthenium dioxide into RuO$_2$NR gaps RuO$_2$.xH$_2$O/Ru/RuO$_2$NR: a hybrid electrode prepared by filling hydrous ruthenium dioxide into gaps of a Ru/RuO$_2$NR electrode IrO$_2$NC: an array of one-dimensional anhydrous iridium dioxide nanocrystals IrO$_2$NC/SA100: an iridium dioxide electrode prepared by growth of IrO$_2$NC on a sapphire (SA) (100) substrate Ir/IrO$_2$NC/SA100: an iridium dioxide electrode comprising iridium formed by reduction of a part of IrO$_2$NC grown on a sapphire (SA) (100) substrate RuO$_2$.xH$_2$O/IrO$_2$NC: a hybrid electrode prepared by filling hydrous ruthenium dioxide into IrO$_2$NC gaps RuO$_2$.xH$_2$O/Ir/IrO$_2$NC: a hybrid electrode prepared by filling hydrous ruthenium dioxide into IrO$_2$NC gaps of an Ir/IrO$_2$NC electrode A hybrid electrode structure of the invention is shown in FIG. 1. The hybrid electrode 1 comprises a one-dimensional anhydrous ruthenium dioxide nanostructure 14 grown on a substrate 12 and hydrous ruthenium dioxide 16 deposited into the gaps of the one-dimensional anhydrous ruthenium dioxide nanostructure 14. The hybrid electrode 1 may further comprise ruthenium (not shown) formed on the one-dimensional anhydrous ruthenium dioxide nanostructure 14. The ruthenium is formed by reduction of a part of the one-dimensional anhydrous ruthenium dioxide nanostructure 14 under a high-temperature treatment. In one embodiment, the one-dimensional anhydrous ruthenium dioxide nanostructure 14 may be replaced by anhydrous iridium dioxide. Similarly, the hybrid electrode 1 may also comprise an iridium layer formed by reduction of a part of a one-dimensional anhydrous iridium dioxide nanostructure 14.

Figure 2:
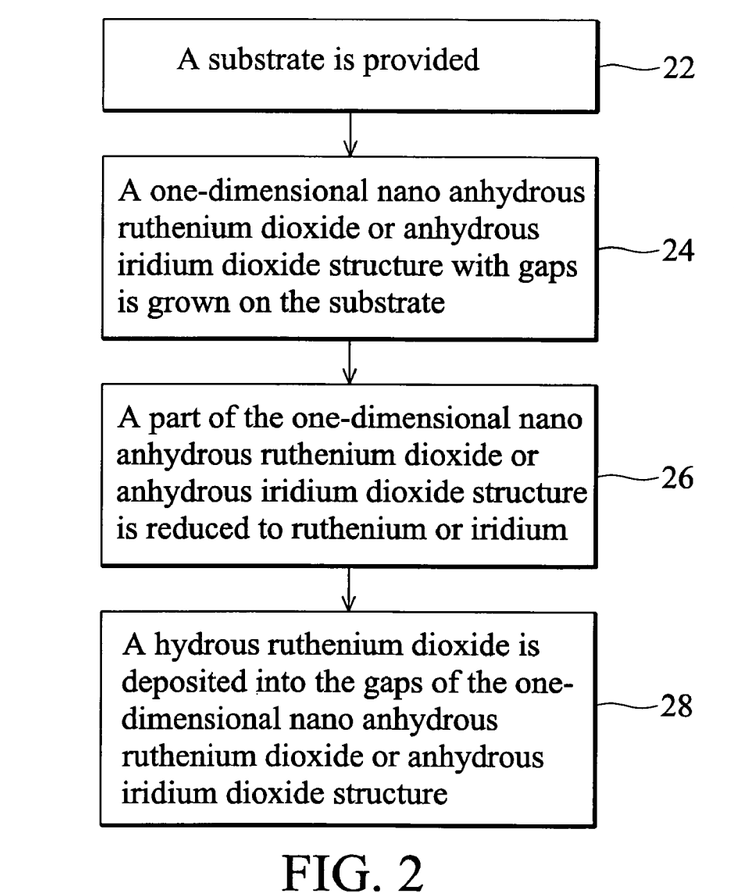
FIG. 2 is a flow chart of a hybrid electrode preparation of the invention.

A fabrication method of the hybrid electrode of the invention is shown in FIG. 2. The method comprises a step 22 of providing a substrate 12, a step 24 of growth of a one-dimensional anhydrous ruthenium dioxide or anhydrous iridium dioxide nanostructure 14 on the substrate 12, and a step 28 of deposition of hydrous ruthenium dioxide 16 into the gaps of the one-dimensional anhydrous ruthenium dioxide or anhydrous iridium dioxide nanostructure 14.

In step 22, the substrate 12 may comprise lithium niobium oxide (LiNbO$_3$, LNO), lithium tantalum oxide (LiTaO$_3$, LTO), silicon, sapphire (SA), titanium, or zinc/silicon crystal.

In step 24, the one-dimensional anhydrous ruthenium dioxide or anhydrous iridium dioxide nanostructure 14 is grown on the substrate 12 by chemical vapor deposition (CVD) or reactive sputtering. The preparation of the one-dimensional anhydrous ruthenium dioxide or anhydrous iridium dioxide nanostructure 14 is described in the following, but is not limited thereto.

Example 1

Preparation of Anhydrous Ruthenium Dioxide Nanorods by Chemical Vapor Deposition (1)

An array of one-dimensional anhydrous ruthenium dioxide nanorods 14 (RuO$_2$NR) was grown on a substrate 12 by metal organic chemical vapor deposition (MOCVD). The organic metal ruthenium liquid precursor was high-purity bis(ethylcyclopentadienyl) ruthenium. The chamber temperature was 300~500° C. The duct temperature was 70~100° C. The evaporation temperature of the precursor was 50~90° C. The background pressure was less than 0.2 mbar. The chamber pressure was 2~200 mbar. The oxygen flow rate was 10~40 sccm. The operation time was 0.5~2 hr. The optimal reaction conditions and structures of growth of the array of one-dimensional anhydrous ruthenium dioxide nanorods 14 on the various substrates 12 by MOCVD using bis(ethylcyclopentadienyl) ruthenium as the precursor are shown in Tables 1a and 1b.

TABLE 1a

| | |
|---|---|
| Precursor | bis(ethylcyclopentadienyl) ruthenium |
| Chamber temperature | 340° C. |
| Duct temperature | 100° C. |
| The evaporation temperature of the precursor | 90° C. |
| Background pressure | 0.001 mbar |
| Chamber pressure | 2 Torr |
| Oxygen flow rate | 20 sccm |
| Operation time | 0.5~2 hr |
| Substrate | LiNbO$_3$ (LNO (100)) |
| The structure of the ruthenium dioxide nanorods | Height: about 0.5~3.5 μm<br>Diameter: about 20~180 nm<br>Growth direction: [001] |

TABLE 1b

| | |
|---|---|
| Precursor | bis(ethylcyclopentadienyl) ruthenium |
| Chamber temperature | 500° C. |
| Duct temperature | 70° C. |
| The evaporation temperature of the precursor | 50° C. |
| Background pressure | 0.2 Torr |
| Chamber pressure | 200 mbar |
| Oxygen flow rate | 20 sccm |
| Operation time | 1~2 hr |
| Substrates | LNO (100), LTO (012), SA (100), SA (012), and Si (100) |
| The structure of the ruthenium dioxide nanorods | Height: about 0.5~2 μm<br>Diameter: about 20~60 nm<br>Growth direction:<br>a. perpendicular to LNO (100), Si (100) and SA (100) substrates<br>b. having a 35° inclined angle with LTO (012) and SA (012) substrates |

Preparation of Anhydrous Ruthenium Dioxide Nanorods by Chemical Vapor Deposition (2)

The bis(ethylcyclopentadienyl) ruthenium precursor was replaced by solid ruthenocene. The array of one-dimensional anhydrous ruthenium dioxide nanorods 14 was grown on the substrate 12 by metal organic chemical vapor deposition (MOCVD). The optimal reaction conditions and $RuO_2NR$ structures are shown in Table 2.

TABLE 2

| Precursor: ruthenocene | Operating conditions | Preferable operating conditions |
|---|---|---|
| Chamber temperature | 300~400° C. | 300~320° C. |
| Duct temperature | 80~100° C. | 100° C. |
| The evaporation temperature of the precursor | 70~90° C. | 90° C. |
| Background pressure | <0.1 mbar | 0.001 mbar |
| Chamber pressure | 2~200 mbar | 2 Torr |
| Oxygen flow rate | 10~40 sccm | 20 sccm |
| Operation time | 0.5~2 hr | 1 hr |
| Substrates | LNO (100) and SA (0001) | |
| The structure of the ruthenium dioxide nanorods | a. on LNO (100) substrate: Height: about 1.3 μm Diameter: about 50~110 nm b. on SA (0001) substrate: Height: about 1.3 μm width: about 60~450 nm Thickness: about 30~50 nm Direction: perpendicular to both substrates [001] | |

Preparation of Anhydrous Ruthenium Dioxide Nanorods by Reactive Sputtering

The array of one-dimensional anhydrous ruthenium dioxide nanorods 14 was grown on the substrate 12 by magnetron reactive sputtering. The optimal reaction conditions and $RuO_2NR$ structures are shown in Table 3.

TABLE 3

| Sputtering source: ruthenium target (99.95%) | Operating conditions | Preferable operating conditions |
|---|---|---|
| Chamber temperature | 250~350° C. | 200° C. |
| Chamber pressure | 0.01~0.1 mbar | 0.075 mbar |
| Argon/Oxygen flow rate | 5~12/1~6 sccm | 11/1 sccm |
| Power | 60~70 W | 65 W |
| Operation time | 1~3 hr | 3 hr |
| Substrates | LNO (100), LTO (012), SA (012), SA (100) and SA (110) | |
| The structure of the ruthenium dioxide nanorods | Height: about 520~540 nm Diameter: about 40~50 nm Growth direction: a. perpendicular to LNO (100) and SA (100) substrates b. having a 35° inclined angle with LTO (012), SA (012) and SA (110) substrates | |

Example 2

Preparation of Anhydrous Iridium Dioxide Nanocrystals by Chemical Vapor Deposition The precursor was replaced by high-purity (methylcyclopentadienyl)(1,5-cyclooctadiene) iridium. An array of one-dimensional anhydrous iridium dioxide nanocrystals 14 was grown on the substrate 12 by metal organic chemical vapor deposition (MOCVD). The optimal reaction conditions and $IrO_2NC$ structures are shown in Table 4.

TABLE 4

| Precursor: (methylcyclopentadienyl) (1,5-cyclooctadiene) iridium | Operating conditions | Preferable operating conditions |
|---|---|---|
| Chamber temperature | 300~500° C. | 350° C. |
| Duct temperature | 100~120° C. | 120° C. |
| The evaporation temperature of the precursor | 90~110° C. | 110° C. |
| Background pressure | <0.1 mbar | 0.001 mbar |
| Chamber pressure | 20~200 mbar | 20 mbar |
| Oxygen flow rate | 100~200 sccm | 100 sccm |
| Operation time | 0.5~2 hr | 1.5 hr |
| Substrates | SA (100) | |
| The structure of the iridium dioxide nanocrystals | Height: about 0.9~1.1 μm Diameter: about 80~120 nm Growth direction: perpendicular to the substrate [001] | |

Preparation of Anhydrous Iridium Dioxide Nanocrystals by Reactive Sputtering

The array of one-dimensional anhydrous iridium dioxide nanocrystals 14 was grown on the substrate 12 by magnetron reactive sputtering. The optimal reaction conditions and $IrO_2NC$ structures are shown in Table 5.

TABLE 5

| Sputtering source: iridium target (99.95%) | Operating conditions | Preferable operating conditions |
|---|---|---|
| Chamber temperature | 250~350° C. | 300° C. |
| Chamber pressure | 0.01~0.1 mbar | 0.065 mbar |
| Argon/Oxygen flow rate | 5~12/1~6 sccm | 5/2.5 sccm |
| Power | 60~70 W | 65 W |
| Operation time | 1~3 hr | 1.5 hr |
| Substrates | SA (012), SA (100) and SA (110) | |
| The structure of the iridium dioxide nanocrystals | Height: about 400 nm Diameter: about 35~45 nm Growth direction: a. perpendicular to SA (100) substrate b. having a 35° inclined angle with SA (012) and SA (110) substrates | |

Specifically, step 24 may further comprise a step 26 of reducing a part of the one-dimensional anhydrous ruthenium dioxide or anhydrous iridium dioxide nanostructure 14 to ruthenium or iridium. A part of the one-dimensional anhydrous ruthenium dioxide or anhydrous iridium dioxide nanostructure 14 prepared by step 24 is reduced to the ruthenium or iridium under high-temperature treatment, for example, but not limited to, a part of the one-dimensional anhydrous ruthenium dioxide or anhydrous iridium dioxide nanostructure 14 formed by step 24 was reduced for 2 hr to the ruthenium or iridium at a chamber pressure of $5 \times 10^{-5}$ Torr and a chamber temperature of 650° C. The electrode prepared by step 26 represented by $Ru/RuO_2NR/LNO$ or $Ir/IrO_2NC/SA100$. The $Ru/RuO_2NR$ or $Ir/IrO_2NC$ electrode retains the original geometric shape and growth direction of the one-dimensional anhydrous ruthenium dioxide or anhydrous iridium dioxide nanostructure 14 and provides an increased conductivity (~$10^5$ S/cm) and more spaces for hydrous ruthenium dioxide filling.

Figure 6:
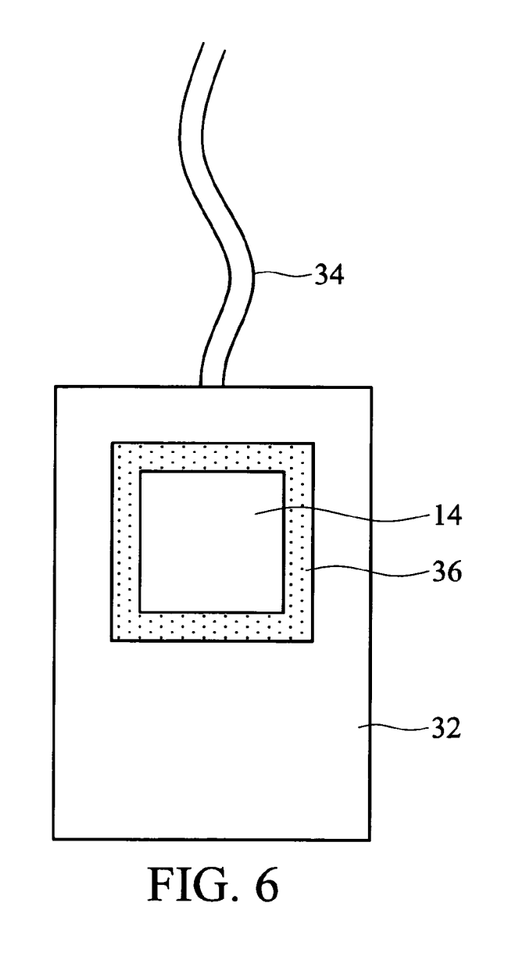
FIG. 6 shows a RuO$_2$-containing or IrO$_2$-containing electrode installed on a PCB substrate according to one embodiment of the invention.

In step 28, the hydrous ruthenium dioxide is deposited into the gaps of the one-dimensional anhydrous ruthenium dioxide or anhydrous iridium dioxide nanostructure 14 by an electrochemical method to form the hybrid electrode 1 represented by $RuO_2.xH_2O/RuO_2NR$, $RuO_2.xH_2O/Ru/RuO_2NR$, $RuO_2.xH_2O/IrO_2NC$ or $RuO_2.xH_2O/Ir/IrO_2NC$, for example, but not limited to, in step 28, the $RuO_2NR/LNO$, $IrO_2NC/LNO$, $Ru/RuO_2NR/LNO$ or $Ir/IrO_2NC/LNO$ electrode prepared by step 24 or step 26 was installed on a PCB copper substrate. Referring to FIG. 6, a silver conductive adhesive (not shown) was pasted on the fringe and back of the electrode to electrically connect to the one-dimensional nanostructure 14 and a copper substrate 32. A copper wire 34 was soldered on the back of the copper substrate 32. All conductive regions were isolated using a "miccrostop" 36 lacquer (Pyramid Plastics) except for the $RuO_2NR$, $Ru/RuO_2NR$, $IrO_2NC$ or $Ir/IrO_2NC$ regions. Hydrous ruthenium dioxide was then electrochemically deposited by galvanostatic mode for 15 min in a three-electrodes setup electrochemical reaction tank, comprises of $RuO_2NR$ or $Ru/RuO_2NR$ or $IrO_2NC$ or $Ir/IrO_2NC$ as a working electrode, Pt plate as a counter electrode and Ag/AgCl saturated KCl as a reference electrode, filled with $RuCl_3$ solution (0.04 M, 50° C.) under a constant current density of 2 $mA \cdot cm^{-2}$. After thermal treatment for 20 min under 150±10° C., the $RuO_2.xH_2O/RuO_2NR$, $RuO_2.xH_2O/Ru/RuO_2NR$, $RuO_2.xH_2O/IrO_2NC$ or $RuO_2.xH_2O/Ir/IrO_2NC$ hybrid electrode 1 was prepared.

Figure 3:
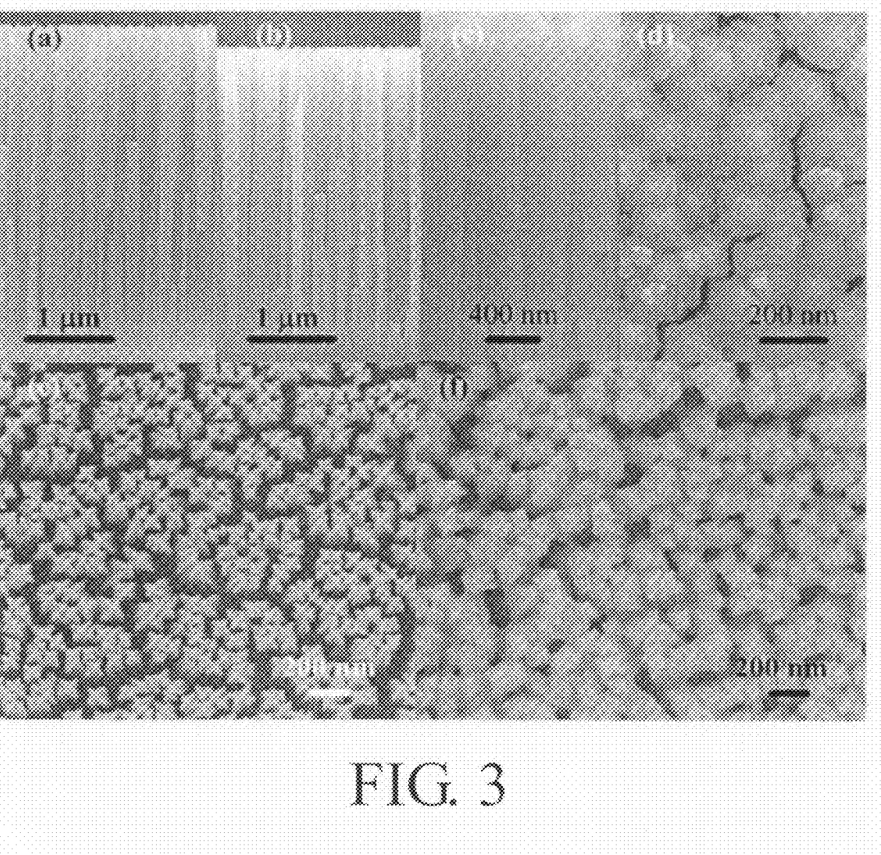
FIG. 3 is a FESEM figure of $RuO_2NR$ and $RuO_2.xH_2O/RuO_2NR$ electrodes according to one embodiment of the invention.

A FESEM figure of the hybrid electrode 1 prepared by the foregoing method is shown in FIG. 3. In FIG. 3, (a) represents a cross-sectional figure of the $RuO_2NR/LNO$ electrode. The $RuO_2NR$ array 14 has the vacant space for $RuO_2.xH_2O$ filling. (b) Nanorods of $Ru/RuO_2NR$ have shrunk in height and diameter after thermal reduction. Hydrous $RuO_2$ covers (c) the top and (d) the cross section of $RuO_2.xH_2O/RuO_2NR$. In the hybrid electrode 1, $RuO_2NR$ serves as an electrical channel and $RuO_2.xH_2O$ serves as a proton conductor and main proton storage material. (e) and (f) are the top views of $Ru/RuO_2NR$ and $RuO_2.xH_2O/Ru/RuO_2NR$, respectively.

Figure 4A:
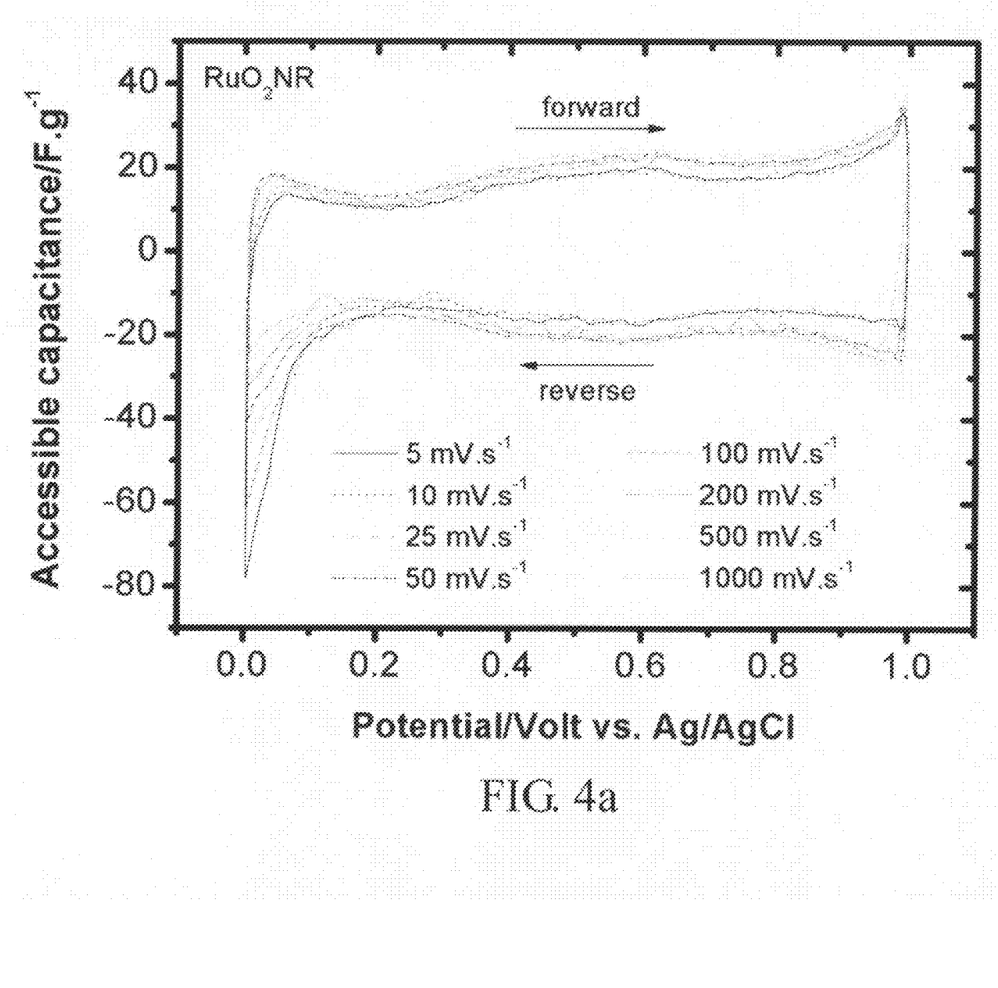
Figure 4B:
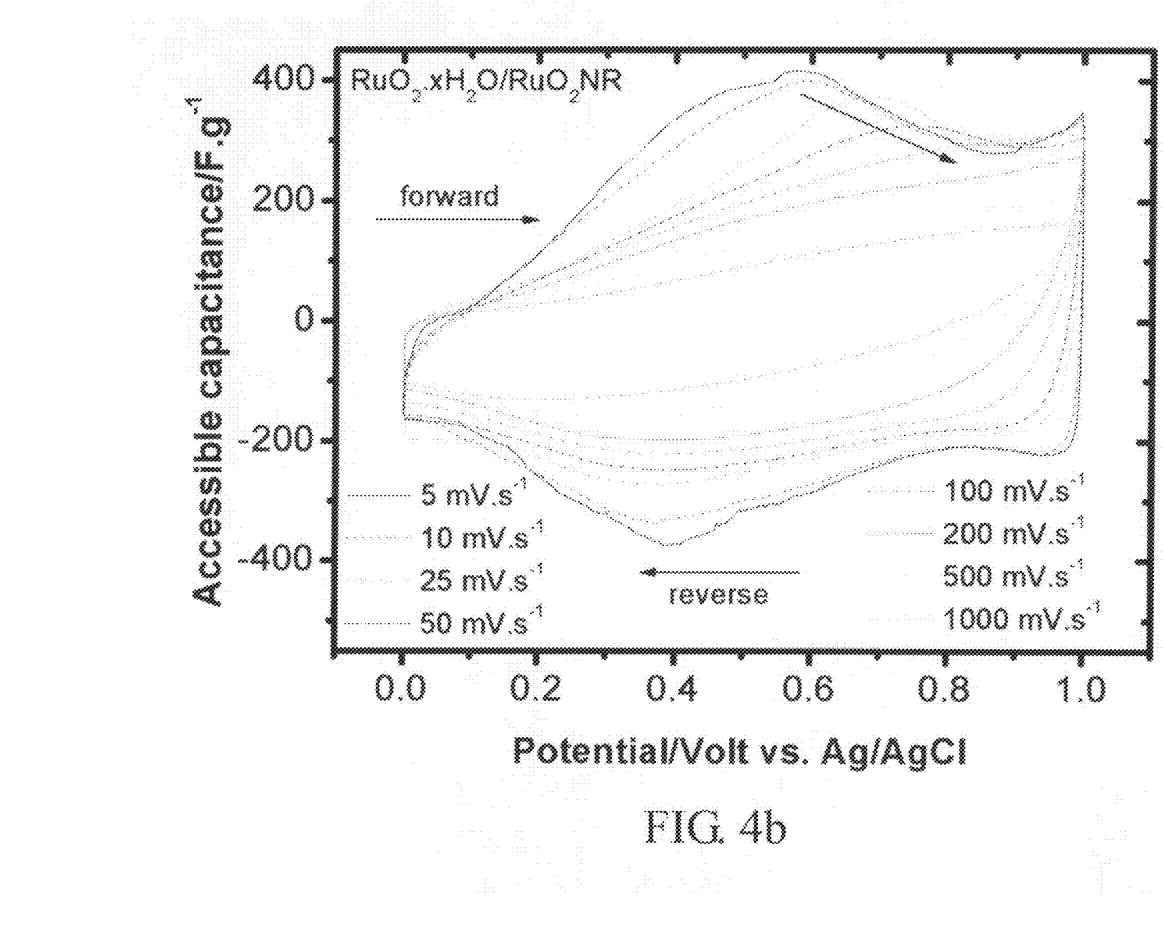
Figure 5A:
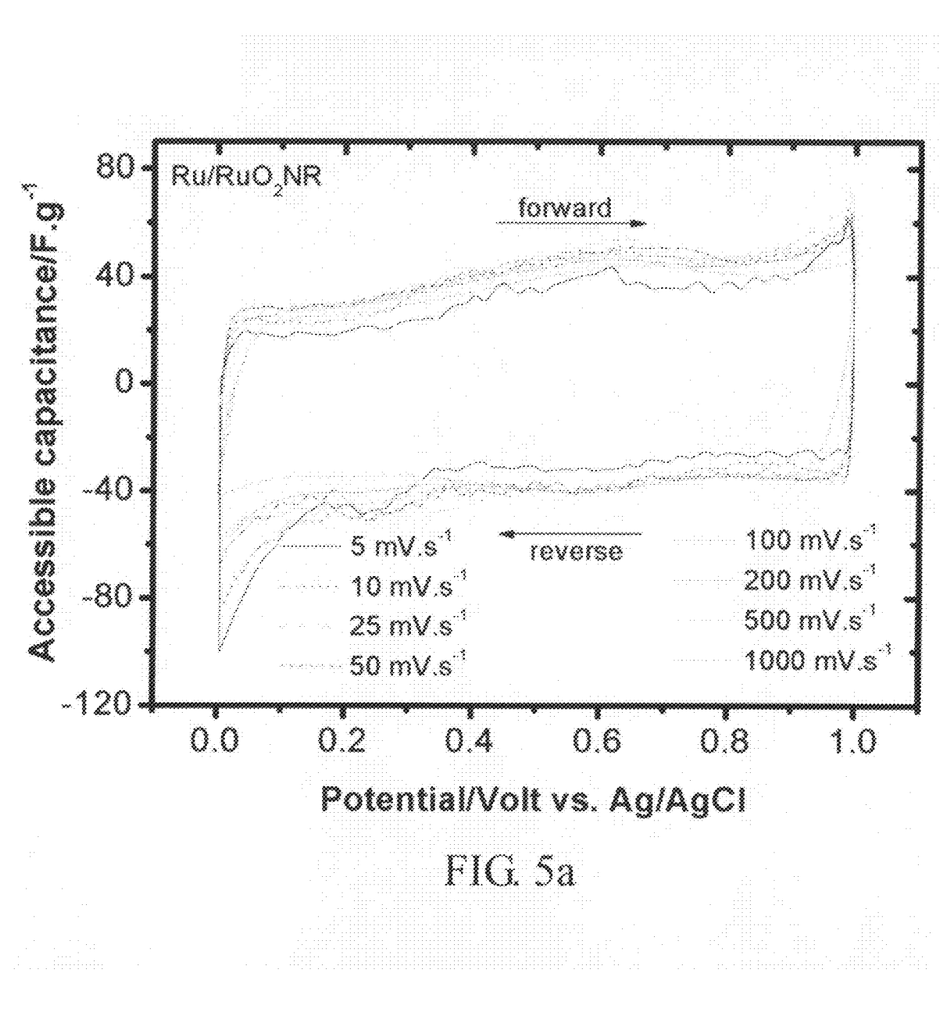
FIG. 5a is a cyclic voltammogram of Ru/RuO$_2$NR electrode according to one embodiment of the invention.
Figure 5B:
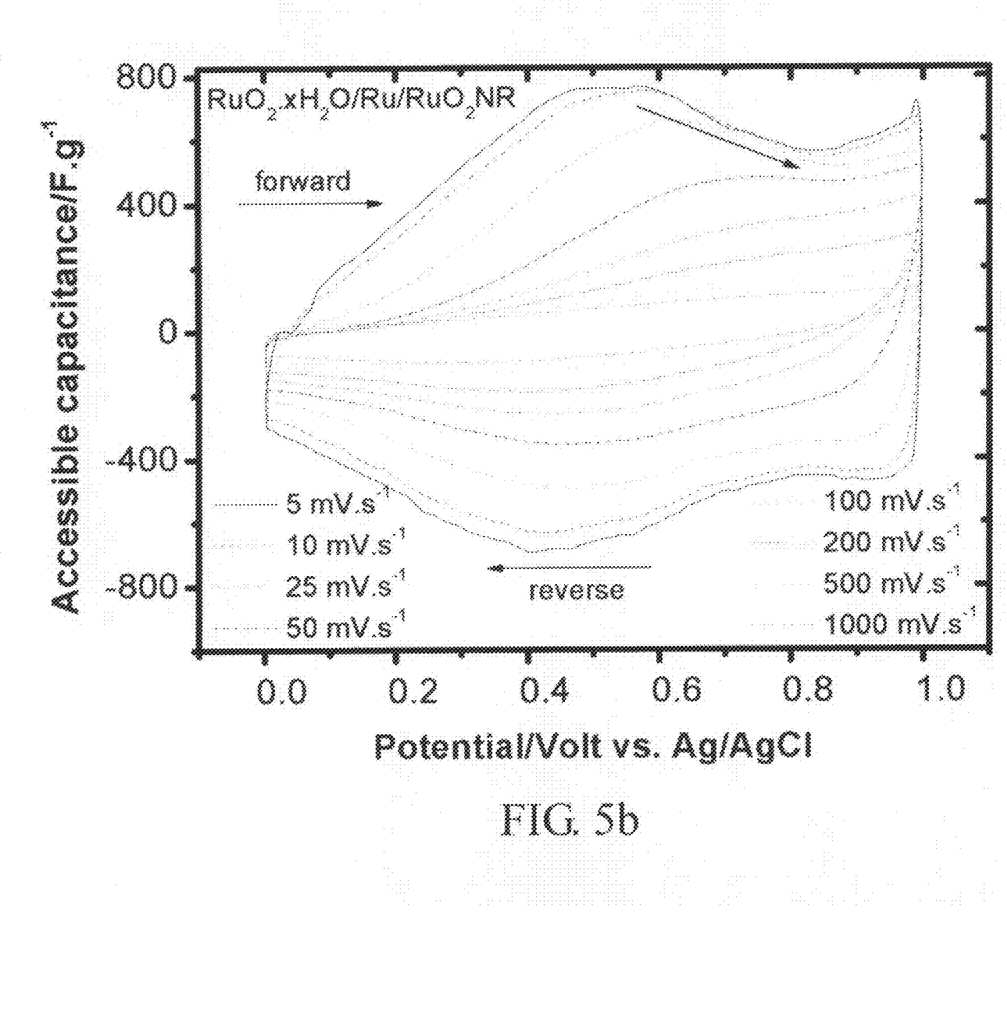
FIG. 5b is a cyclic voltammogram of RuO$_2$.xH$_2$O/Ru/RuO$_2$NR electrode according to one embodiment of the invention.

Cyclic voltammograms of $RuO_2NR$ and $RuO_2.xH_2O/RuO_2NR$ electrodes under various scan rates are shown in FIGS. 4a and 4b. FIG. 4a represents $RuO_2NR$ electrode and FIG. 4b represents $RuO_2.xH_2O/RuO_2NR$ hybrid electrode. The capacitance is defined by response current divided by the multiplication of scan rate, potential window and sample's area or weight, for example, as the scan rate is 5 mV/s, the capacitance of the $RuO_2.xH_2O/RuO_2NR$ hybrid electrode achieves 258.3 F/g (297 $mF/cm^2$), significantly larger than that of the $RuO_2NR$ electrode (17 F/g (13.7 $mF/cm^2$)). Cyclic voltammograms of $Ru/RuO_2NR$ and $RuO_2.xH_2O/Ru/RuO_2NR$ electrodes are shown in FIGS. 5a and 5b. FIG. 5a represent $Ru/RuO_2NR$ electrode and FIG. 5b represent $RuO_2.xH_2O/Ru/RuO_2NR$ hybrid electrode, for example, as the scan rate is 5 mV/s, the capacitance of the $Ru/RuO_2NR$ electrode is 34.3 F/g (31.9 $mF/cm^2$). However, after being filled with $RuO_2.xH_2O$, the capacitance of the $RuO_2.xH_2O/RuO_2NR$ hybrid electrode is raised to 525.8 F/g (878.1 $mF/cm^2$). Thus, in accordance with FIGS. 4a~4b and 5a~5b, the capacitance of the ruthenium dioxide hybrid electrode 1 filled with $RuO_2.xH_2O$ is effectively improved. These behaviors also can be found on $IrO_2$ based hybrid electrodes. For example at 5 mV/s scan rate, the capacitance of the $RuO_2.xH_2O/IrO_2NC$ hybrid electrode achieves 300 F/g (381 $mF/cm^2$), significantly larger than that of the $IrO_2NC$ electrode (5.6 F/g (5.5 $mF/cm^2$)). The capacitance of $Ir/IrO_2NC$ is 30.5 F/g (27.8 $mF/cm^2$) and after being filled with $RuO_2.xH_2O$, the capacitance of the $RuO_2.xH_2O/Ir/IrO_2NC$ hybrid electrode is raised to 505 F/g (712 $mF/cm^2$).

Table 6 shows mass-specific capacitance values of $RuO_2NR$, $Ru/RuO_2NR$, $RuO_2.xH_2O/RuO_2NR$, and $RuO_2.xH_2O/Ru/RuO_2NR$, measured at various scan rates.

TABLE 6

| Sweep rate ($mVs^{-1}$) | $RuO_2NR$ ($Fg^{-1}$) | $Ru/RuO_2NR$ ($Fg^{-1}$) | $RuO_2 \cdot xH_2O/RuO_2NR$ ($Fg^{-1}$) | $RuO_2 \cdot xH_2O/Ru/RuO_2NR$ ($Fg^{-1}$) |
|---|---|---|---|---|
| 5 | 17 | 34.3 | 258.3 | 525.8 |
| 10 | 16.5 | 40.4 | 247.4 | 491.8 |
| 25 | 20.7 | 42.4 | 212.7 | 384.7 |
| 50 | 19.9 | 40.4 | 193.9 | 261.7 |
| 100 | 18.8 | 40 | 172.8 | 175.9 |
| 200 | 18.4 | 38.4 | 141.5 | 119.8 |
| 500 | 18.3 | 35.9 | 103.3 | 78.6 |
| 1000 | 17.8 | 34 | 76 | 60 |

The hybrid electrode 1 provided by the invention uses the one-dimensional anhydrous ruthenium dioxide or anhydrous iridium dioxide nanostructure 14 as an electrical conductor and uses the hydrous ruthenium dioxide 16 as a charge storage material to achieve high capacitance and high power. The capacitance thereof can further be improved by reduction of a part of the one-dimensional anhydrous ruthenium dioxide or anhydrous iridium dioxide nanostructure 14 to ruthenium or iridium. Additionally, due to its simple fabrication, the invention can also be applied to mass production of high capacitance electrochemical capacitors.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A hybrid electrode, comprising:
    a one-dimensional anhydrous ruthenium dioxide nanostructure with gaps grown on a substrate; and
    a hydrous ruthenium dioxide deposited into the gaps of the one-dimensional anhydrous ruthenium dioxide nanostructure.

2. The hybrid electrode as claimed in claim 1, wherein the hybrid electrode further comprises a ruthenium layer formed on the one-dimensional anhydrous ruthenium dioxide nanostructure.

3. The hybrid electrode as claimed in claim 2, wherein the ruthenium layer is formed by reduction of a part of the one-dimensional anhydrous ruthenium dioxide nanostructure.

4. The hybrid electrode as claimed in claim 3, wherein the one-dimensional anhydrous ruthenium dioxide nanostructure is reduced to ruthenium by high-temperature treatment.

5. The hybrid electrode as claimed in claim 1, wherein the one-dimensional anhydrous ruthenium dioxide nanostructure is selected from the group consisting of nanosilk, nanowire, nanorod, nanotube and nanobelt.

6. The hybrid electrode as claimed in claim 2, wherein the one-dimensional anhydrous ruthenium dioxide nanostructure is selected from the group consisting of nanosilk, nanowire, nanorod, nanotube and nanobelt.

7. The hybrid electrode as claimed in claim 1, wherein the one-dimensional anhydrous ruthenium dioxide nanostructure is grown on the substrate by chemical vapor deposition or reactive sputtering.

8. The hybrid electrode as claimed in claim 2, wherein the one-dimensional anhydrous ruthenium dioxide nanostructure is grown on the substrate by chemical vapor deposition or reactive sputtering.

9. The hybrid electrode as claimed in claim 1, wherein the hydrous ruthenium dioxide is deposited into the gaps of the one-dimensional anhydrous ruthenium dioxide nanostructure by an electrochemical method.

10. The hybrid electrode as claimed in claim 2, wherein the hydrous ruthenium dioxide is deposited into the gaps of the one-dimensional anhydrous ruthenium dioxide nanostructure by an electrochemical method.

11. A hybrid electrode, comprising:
a one-dimensional anhydrous iridium dioxide nanostructure with gaps grown on a substrate; and
a hydrous ruthenium dioxide deposited into the gaps of the one-dimensional anhydrous iridium dioxide nanostructure.

12. The hybrid electrode as claimed in claim 11, wherein the hybrid electrode further comprises an iridium layer formed on the one-dimensional anhydrous iridium dioxide nanostructure.

13. The hybrid electrode as claimed in claim 12, wherein the iridium layer is formed by reduction of a part of the one-dimensional anhydrous iridium dioxide nanostructure.

14. The hybrid electrode as claimed in claim 13, wherein the one-dimensional anhydrous iridium dioxide nanostructure is reduced to iridium by high-temperature treatment.

15. The hybrid electrode as claimed in claim 11, wherein the one-dimensional anhydrous iridium dioxide nanostructure is selected from the group consisting of nanosilk, nanowire, nanorod, nanotube and nanobelt.

16. The hybrid electrode as claimed in claim 12, wherein the one-dimensional anhydrous iridium dioxide nanostructure is selected from the group consisting of nanosilk, nanowire, nanorod, nanotube and nanobelt.

17. The hybrid electrode as claimed in claim 11, wherein the one-dimensional anhydrous iridium dioxide nanostructure is grown on the substrate by chemical vapor deposition or reactive sputtering.

18. The hybrid electrode as claimed in claim 12, wherein the one-dimensional anhydrous iridium dioxide nanostructure is grown on the substrate by chemical vapor deposition or reactive sputtering.

19. The hybrid electrode as claimed in claim 11, wherein the hydrous ruthenium dioxide is deposited into the gaps of the one-dimensional anhydrous iridium dioxide nanostructure by an electrochemical method.

20. The hybrid electrode as claimed in claim 12, wherein the hydrous ruthenium dioxide is deposited into the gaps of the one-dimensional anhydrous iridium dioxide nanostructure by an electrochemical method.

21. A method of preparing a hybrid electrode, comprising:
providing a substrate;
growing a one-dimensional anhydrous ruthenium dioxide nanostructure with gaps on the substrate; and
depositing a hydrous ruthenium dioxide into the gaps of the one-dimensional anhydrous ruthenium dioxide nanostructure.

22. The method as claimed in claim 21, further comprising reducing a part of the one-dimensional anhydrous ruthenium dioxide nanostructure to ruthenium before the hydrous ruthenium dioxide is deposited into the gaps of the one-dimensional anhydrous ruthenium dioxide nanostructure.

23. The method as claimed in claim 21, wherein the one-dimensional anhydrous ruthenium dioxide nanostructure is replaced by a one-dimensional anhydrous iridium dioxide nanostructure.

24. The method as claimed in claim 23, further comprising reducing a part of the one-dimensional anhydrous iridium dioxide nanostructure to iridium before the hydrous ruthenium dioxide is deposited into the gaps of the one-dimensional anhydrous iridium dioxide nanostructure.

25. The method as claimed in claim 21, wherein the one-dimensional anhydrous ruthenium dioxide nanostructure or the one-dimensional anhydrous iridium dioxide nanostructure is grown on the substrate by chemical vapor deposition or reactive sputtering.

26. The method as claimed in claim 22, wherein the one-dimensional anhydrous ruthenium dioxide nanostructure or the one-dimensional anhydrous iridium dioxide nanostructure is grown on the substrate by chemical vapor deposition or reactive sputtering.

27. The method as claimed in claim 23, wherein the one-dimensional anhydrous ruthenium dioxide nanostructure or the one-dimensional anhydrous iridium dioxide nanostructure is grown on the substrate by chemical vapor deposition or reactive sputtering.

28. The method as claimed in claim 24, wherein the one-dimensional anhydrous ruthenium dioxide nanostructure or the one-dimensional anhydrous iridium dioxide nanostructure is grown on the substrate by chemical vapor deposition or reactive sputtering.

29. The method as claimed in claim 21, wherein the hydrous ruthenium dioxide is deposited into the gaps of the one-dimensional anhydrous ruthenium dioxide nanostructure or the one-dimensional anhydrous iridium dioxide nanostructure by an electrochemical method.

30. The method as claimed in claim 22, wherein the hydrous ruthenium dioxide is deposited into the gaps of the one-dimensional anhydrous ruthenium dioxide nanostructure or the one-dimensional anhydrous iridium dioxide nanostructure by an electrochemical method.

31. The method as claimed in claim 23, wherein the hydrous ruthenium dioxide is deposited into the gaps of the one-dimensional anhydrous ruthenium dioxide nanostructure or the one-dimensional anhydrous iridium dioxide nanostructure by an electrochemical method.

32. The method as claimed in claim 24, wherein the hydrous ruthenium dioxide is deposited into the gaps of the one-dimensional anhydrous ruthenium dioxide nanostructure or the one-dimensional anhydrous iridium dioxide nanostructure by an electrochemical method.

33. An electrochemical microcapacitor comprising the hybrid electrode as claimed in claim 1.

34. An electrochemical microcapacitor comprising the hybrid electrode as claimed in claim 2.

35. An electrochemical microcapacitor comprising the hybrid electrode as claimed in claim 11.

36. An electrochemical microcapacitor comprising the hybrid electrode as claimed in claim 12.

* * * * *